July 24, 1956 H. M. BACH 2,756,283
CATHODE INPUT AMPLIFIERS
Filed Nov. 13, 1951

INVENTOR
Henry M. Bach
BY
ATTORNEY

United States Patent Office 2,756,283

Patented July 24, 1956

2,756,283

CATHODE INPUT AMPLIFIERS

Henry M. Bach, Woodmere, N. Y., assignor to Radio Corporation of America, a corporation of Delaware Application November 13, 1951, Serial No. 256,067

12 Claims. (Cl. 179—171)

This invention relates mainly to high frequency receivers such as television amplitude and frequency modulation receivers and the like, and more particularly to a certain type of electron tube amplifier normally used in the input and other high frequency signal circuits of such receivers.

Cathode input or grounded-grid amplifiers are frequently employed in high frequency receivers and the like, as in the signal input circuit with the antenna transmission line feeding onto the cathode of a triode amplifier. In such a circuit, the output signal current may flow through a pair of impedance elements serially connected between the anode and cathode with the input signal supplied from the line, between the cathode and the junction of the impedance elements. The signal output voltages are developed between the anode and the junction of the above impedance elements. The grid is connected to the junction of the impedance elements, which junction is normally at a datum or ground potential.

The circuit above described has a relatively low input impedance and excellent results, particularly with regard to signal-to-noise ratio performance, are obtained with the use of such cathode input amplifiers. One difficulty encountered, however, where grounded-grid operation is employed as above mentioned, is that of cross-modulation from strong signals substantially higher or lower in frequency than the desired signals due to lack of selectivity in the input circuit.

It is an object of this invention to provide an improved type of cathode input electronic tube amplifier for high frequency receivers and the like, which is essentially aperiodic while being relatively immune from cross modulation effects from strong signals substantially higher and lower in frequency than a selected signal.

It is another object of this invention to provide frequency selective circuits for cathode input amplifiers for repeater systems and the like, which permit amplification of signals at certain frequencies but which renders such amplifiers substantially gainless for signals of other and different frequencies.

It is a further object of this invention to provide a cathode input type amplifier having improved frequency selective networks for selectively changing the mode of operation from that of signal amplification at certain frequencies to attenuation by diode operation for signals of other and different frequencies.

In accordance with one embodiment of this invention, a frequency selective network having three terminals is arranged with one terminal connected to the control grid of a cathode input amplifier and the two other terminals connected respectively to the cathode and to the ground conductor of such amplifier. When certain frequency signal currents are received, substantially grounded-grid operation with desired gain is permitted. However, the frequency selective network functions upon the application of signals of other and different frequencies, to effectively connect or couple the control grid and cathode together, thereby rendering the tube substantially gainless or incapable of amplifying at such frequencies.

The invention will further be understood from the following description of various embodiments thereof with reference to the accompanying drawings, and its scope is pointed out in the appended claims.

Figure 1:
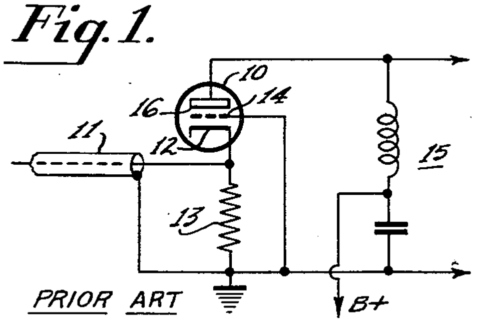
Figure 1 is a schematic circuit diagram of a conventional cathode input amplifier, representing the prior art.

Referring to the drawing, in which like circuits and elements are designated by the same reference characters throughout, and in particular to Figure 1, a conventional cathode input or grounded-grid amplifier having an electron discharge device or thermionic tube 10 is shown in connection with suitable input means, such as a transmission line 11, connected between a cathode 12 and a point of datum potential or ground, to which the cathode 12 is also connected through a cathode input impedance such as a resistor 13. The control grid 14 of the tube 10 is connected to ground in a conventional manner. The tube 10 is provided with a suitable output circuit as indicated at 15. Whereas the output circuit is shown as an inductance in the figures, it will be understood that the output plate current variations can be caused to flow through any other type of impedance such as a resonant circuit, a resistive impedance, and the like to develop the desired output voltage.

Figure 2:
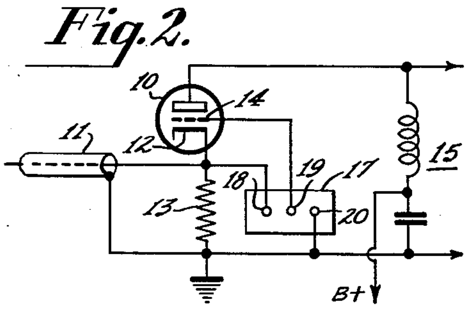
Figure 2 is a schematic circuit diagram of a cathode input amplifier provided with frequency selecting and determining circuits embodying the invention.

Referring to Figure 2, the translating or repeater circuit arrangement of Figure 1 is modified in accordance with the invention to include a three-terminal frequency-selective network 17. In this circuit it will be noted that the control grid 14 of the amplifier tube 10 is connected to a center terminal 19, while the cathode 12 and the grounded end of the impedance 13 are connected respectively to the end terminals 18 and 20 of the network.

Between the terminals 18 and 20 are connected combinations of elements such as typical resistor, capacitor and inductor filter combinations, which provide desired frequency selection, or amplification of signal currents of any desired frequency. By way of example for such networks in accordance with the invention, Figure 3, to which attention is directed along with Figure 2 shows a low-pass filter network comprising a capacitor 21 connected between the terminals 18 and 19 and a resistor 22 connected between the terminals 19 and 20. In the circuit of Figure 4 which is otherwise similar to that of Figures 2 and 3, a high-pass filter network comprises an inductor 24 connected between the terminals 18 and 19 and a capacitor 25 connected between the terminals 19 and 20 for grounding the grid.

Figure 3:
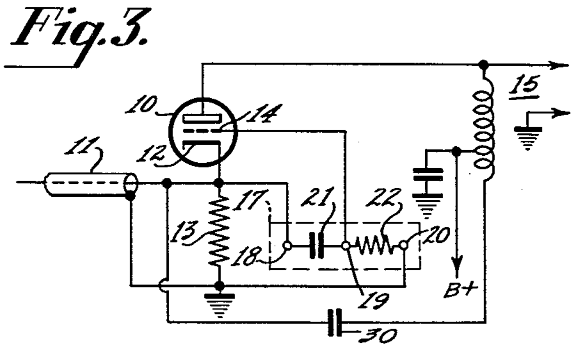
Figures 3 through 6 are schematic circuit diagrams of cathode input type electronic tube amplifiers provided with frequency selective networks employed with cathode input amplifiers in accordance with the invention.
Figure 4:
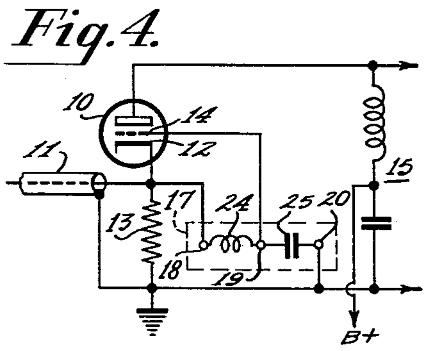

The frequency selecting arrangements added to the cathode input amplifier as above noted in Figures 2, 3 and 4 may be considered in the light of a frequency selective potentiometer having its sliding contact connected to the grid and its two other terminals connected to the cathode and to ground. For certain predetermined signal frequency currents applied between the cathode 12 and ground, the grid 14 is grounded and normal stage gain is obtained. However, in the case of signal currents of different frequencies, it will be seen that the grid 14 is effectively connected to the cathode 12 of the tube, thus effectively making the tube 10 operate as a diode and thereby preventing amplification of such different signal currents. Thus the capacitor 21 of Figure 3, for example, acts to effectuate diode operation of the tube 10 and consequently to effect reduction in amplification of currents at frequencies above the ranges desired. Similarly, the inductor 26 of Figure 4 acts to effect reduction of gain of signal currents of frequencies below the ranges desired. Because no signal potential is developed between control electrode and cathode at frequencies below the desired range, no amplified signal currents in the undesired range flow through the output impedance and are available at the output.

Figure 5:
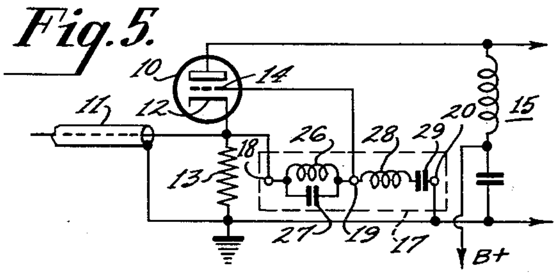

Figure 5 shows the circuit of Figure 2 further modified by the use of a three-terminal band-pass network employing a parallel tuned inductor-capacitor (LC) circuit or network comprising an inductor 26 and a capacitor 27 connected in parallel between the terminals 18 and 19 of the three-terminal network, and a series tuned LC network or circuit comprising an inductor 28 and a capacitor 29 serially connected between the terminals 19 and 20 thereof. By tuning the respective parallel and series circuits to the same narrow frequency band, these circuits cooperate to permit amplification within such frequency band and to prevent amplification above or below such frequency band. This results for the reason that, in the narrow range of frequencies desired, the parallel tuned circuit offers a relatively high impedance, while the series tuned network is of sufficiently low impedance to effectively ground the grid and assure conventional stage amplification. On the other hand, for frequencies above or below the range desired, the series LC circuit is a high impedance and the parallel LC circuit a relatively low impedance, thus effectively connecting the grid and cathode together to effect diode operation of the tube 10 and prevent amplification of signals thereby.

Figure 6:
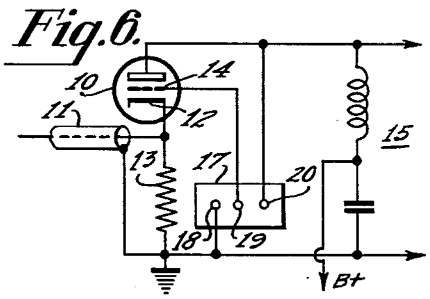

Broadly speaking, it is desired to use circuit elements connected or added to a cathode input amplifier to effect change of operation from that of triode to that of a diode as a function of frequency. The invention is not limited to a three-terminal network disposed between the cathode, grid and ground as above described; instead, for example, as in Figure 6, to which attention is now directed, a three-terminal network may be disposed between the anode, grid and ground, with the end terminals 18 and 20 connected respectively to the cathode and the anode, and the center terminal 19 connected to the grid. Here, also, diode operation of the tube 10 obtains at frequencies above and/or below the frequencies the three-terminal network is designed to pass.

As indicated by the network of Figures 3 and 4, the resistor 22 of Figure 3 may be replaced by an inductor, or the inductor 24 of Figure 4 may be replaced by a resistor. Similarly the parallel tuned and series tuned circuits of the band pass network shown in Figure 5 may be interchanged to provide a band stop or band elimination network for preventing amplification of signals within a particular band of frequencies.

A neutralizing circuit arrangement may be employed for the tube 10 used in accordance with this invention to prevent transmission of undesired signal currents due to interelectrode capacitive coupling when such tube operates as a diode as above explained. The neutralizing arrangement shown by way of example in Figure 3 employs a neutralizing capacitor 30 connected between the output circuit and the cathode 12 of the tube 10 as indicated. By this means, the diode interelectrode capacitance between the anode and the grid-cathode combination at undesired frequencies is neutralized in a well known manner, and transmission of signal currents of appreciable magnitude at such undesired frequencies is minimized.

Figure 7:
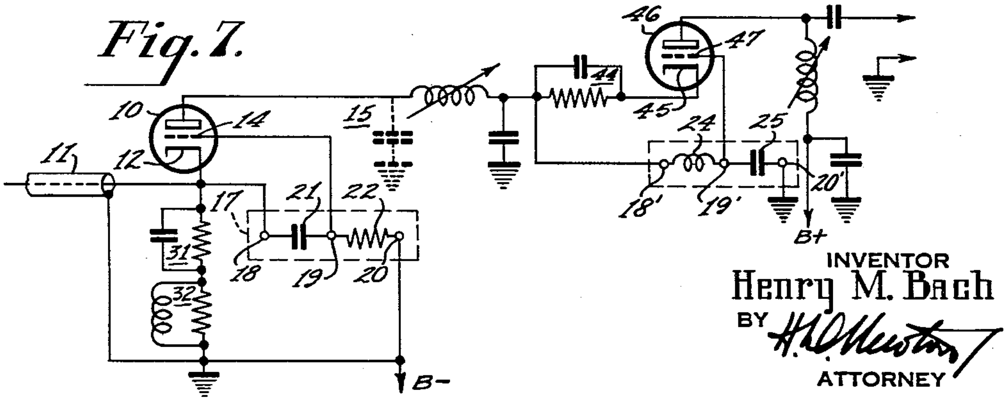
Figure 7 is a diagrammatic circuit diagram of a two-stage network utilizing frequency selecting or determining circuits in accordance with the invention.

Figure 7 represents one band-pass circuit arrangement employing cathode input amplifiers in accordance with the invention. In the exemplary circuit shown, a conventional parallel RC biasing circuit 31 and a parallel RL circuit 32, also conventional for tuning out input reactance, are serially connected between the cathode 12 of the tube 10 and ground. A low-pass circuit of the type shown in Figure 3 is added to the circuit in accordance with the invention as above described. The output circuit 15 of the tube 10 is coupled through a biasing circuit 44 to the cathode 45 of a cathode input amplifier tube 46 constituting a second amplifier stage. A high-pass network such as that shown in Figure 4 is disposed between the cathode 45, the grid 47 and ground through connection with terminals 18', 19', and 20', in accordance with the invention as above described. By such cascade arrangement of one low-pass stage and one high-pass stage, a desired band-pass characteristic is obtained.

The invention likewise has use in D. C. amplifier arrangements wherein it is desired to minimize A. C. amplification. For example, the circuit of Figure 2 using the RC network 21, 22 of Figure 3, by suitable choice of values for 21 and 22 provides normal grounded grid operation for D. C. input signals and diode operation for A. C. input signals. Of course in such applications the output load coil is an iron core inductance or may be replaced by an ohmic resistance.

From the foregoing description, it will be seen that an improved cathode input type of amplifier may be provided by including therein means for changing the mode of operation from that of conventional cathode input or grounded-grid amplifiers at certain desired signal frequencies to that of an amplifier which at certain other signal frequencies provides diode operation to prevent amplification and interference.

What is claimed is:

1. A translating circuit including an electron discharge device having at least a cathode, anode and control electrode, a potential source polarizing the anode positive with respect to the cathode to cause electron space current to flow, an impedance connected between said anode and said cathode, signal input terminals connected between said cathode and a point on said impedance, a frequency selective network including serially connected impedance elements shunting said input terminals, a connection from said control electrode to the junction of said serially connected impedance elements, the impedance element connected between said control electrode and cathode being selected to offer relatively lower impedance to undesired frequency components and relatively higher impedance to desired frequency components than the impedance element connected between said control electrode and the other of said input terminals, and output terminals disposed between the anode and said point.

2. A frequency band pass repeater arrangement including cascaded electron discharge devices having electrodes including at least a control grid, and frequency responsive circuit elements having a plurality of terminals associated with each device, said control electrodes connected to one of the terminals associated with said device, another of said electrodes being connected to a second of the terminals associated with said device, the junction of said elements being connected to a third of the terminals associated with said device and said circuit elements including means for operating one of said devices as a diode for all frequencies below and the other of said devices as a diode for all frequencies above said frequency band pass.

3. A translating circuit including an electron discharge device having at least a cathode, anode and control electrode, a potential source polarizing the anode positive with respect to cathode to cause electron space current to flow, an impedance element connected between said anode and said cathode, signal input terminals connected between said cathode and a point on said impedance, a frequency selective network including two serially connected impedances connected between said point and said anode, a connection from said control electrode to the junction of said serially connected impedance elements and output terminals disposed between said point and anode.

4. A high frequency selective signal amplifier system comprising, a thermionic tube having an anode, a cathode and a control grid, an input circuit connected between said cathode and ground, an output circuit including an impedance element connected with said tube, a three-terminal network, the center terminal of said network being connected to said control grid and the other terminals of said network being connected respectively to said cathode and to ground, a capacitor connected between said center terminal and said cathode connected terminal, and an impedance element having high impedance to certain high frequency currents connected between said center terminal and said ground connected terminal, whereby amplification of desired low frequency currents applied to said input circuit is effected and whereby said network effects diode operation of said tube at undesired frequencies.

5. A frequency selective amplifier operable to amplify signals in a predetermined frequency range and attenuate signals having a frequency outside of said predetermined range, comprising a thermionic tube having an anode, a cathode and a control grid, an output circuit means including an impedance connected with the anode of said tube, an input circuit connected between said cathode and ground, a three-terminal frequency selective network, the center terminal of said network being connected to said control grid, the other terminals of said network being connected respectively to said cathode and ground, said network comprising an inductive impedance element having relatively low impedance to low frequency currents connected between said center terminal and said cathode connected terminal, and a capacitor having low impedance to certain high frequency currents connected between said center terminal and said ground connected terminal, said inductive impedance element offering relatively lower impedance to frequency components outside of said predetermined range and relatively higher impedance to signals in said predetermined frequency range than said capacitor whereby said network permits amplification of currents of desired relatively high frequencies, and whereby said tube effectively operates as a diode to prevent amplification of signal currents below said desired high frequency currents.

6. A frequency selective utilization network for operating grounded-grid amplifiers in cascade to pass a predetermined band of signal currents comprising, in combination, first and second thermionic tubes each having an anode, a cathode and a control grid, an input circuit connected between each of said cathodes and ground, an output circuit for each of said tubes, the output of said first tube being coupled to the input circuit of said second tube, a three-terminal low-pass frequency selective network having its center terminal connected to the control grid of said first tube and its other terminals connected respectively to the cathode of said first tube and ground, a first capacitor connected between the center terminal and cathode-connected terminal of said low-pass frequency selective network, a first impedance element having low impedance to certain low frequency currents connected between the center terminal and ground-connected terminal of said low-pass frequency selective network, a three-terminal high-pass frequency selective network having its center terminal connected to the control grid of said second tube and its other terminals connected respectively to the cathode of said second tube and ground, a second capacitor having low impedance to certain desired frequency currents connected between the center terminal and ground-connected terminal of said high-pass frequency selective network, and a second impedance element having high impedance to said desired frequency currents connected between the center terminal and cathode-connected terminal of said high-pass frequency selective network.

7. A signal translating circuit including an electron discharge device having at least a control electrode, means for supplying input signals to and deriving output signals from said circuit, circuit connections to said device including means for operating said device as an amplifier for certain frequencies and as a diode for other frequencies, and means for neutralizing the effective diode interelectrode capacities to minimize the signal transmission through said circuit at said other frequencies.

8. A frequency selective amplifier circuit including an electron discharge device having at least a cathode, anode and control electrode, an anode impedance and a cathode impedance serially connected between anode and cathode, a third impedance element connected between said control electrode and said cathode, a fourth impedance element connected between said control electrode and the junction of said anode impedance and a cathode impedance, the ratio of the impedance of said third impedance element to the impedance of said fourth impedance element being greater than unity for the desired frequency components to be amplified and less than unity for undesired components so that the desired frequency components are amplified by said discharge device and developed across said anode impedance substantially to the exclusion of the undesired frequency components.

9. An amplifier circuit including an electron discharge device having at least a cathode, anode and control electrode, at least a pair of serially connected impedances connected between the cathode and anode of said device, means providing signal input terminals across the impedance connected to the cathode for connection with a source of input waves including desired and undesired frequency components, an output circuit including means for utilizing output voltage variations developed across the impedance connected to the anode, a first frequency responsive impedance means connected between said control electrode and the junction of said serially connected impedances, and a second frequency responsive impedance means connected between said control electrode and another of said electrodes, the ratio of the impedance of said first frequency responsive impedance element to the impedance of said second frequency responsive impedance element being less than unity for desired frequency components and greater than unity for undesired frequency components so that the desired frequencies are amplified by said discharge device and developed across the impedance connected with said anode substantially to the exclusion of the undesired frequencies.

10. A frequency selective arrangement for repeating desired frequency components and excluding undesired frequency components of an input wave bearing desired and undesired frequency components including an electron discharge device having a cathode, anode and control electrode, a first impedance means having end terminals and an intermediate tap, said terminals connected respectively to said cathode and anode, means for impressing said input wave between said cathode and said tap, a second impedance means disposed between said control electrode and one of said terminals, a third impedance means disposed between said tap and said control electrode, said third impedance means having a lower impedance to the desired frequency components and a higher impedance to the undesired frequency components than said second impedance means, whereby the desired frequency components are amplified by said discharge device and developed between said anode and tap substantially to the exclusion of the undesired frequency components.

11. A frequency selective circuit for repeating desired frequency components of an input wave and minimizing the transmission of undesired components including an electron discharge device having a cathode, anode and control electrode, a first impedance means disposed between the control electrode and cathode, a second impedance means disposed between cathode and anode, said second impedance means having an intermediate tap, means for impressing said waves between said cathode and tap, and a third impedance means disposed between said tap and said control electrode, said third means having a lower impedance to the desired frequency components and a higher impedance to said undesired frequency components than said second impedance, so that the desired frequency components are developed between said tap and anode to the substantial exclusion of said undesired frequency components.

12. A frequency selective arrangement for repeating desired frequency components and excluding undesired frequency components of an input wave having desired and undesired frequency components including an input terminal, an output terminal and a point of reference potential common to the input and output terminals of said arrangement, means for impressing said waves between said input terminal and said point of reference potential, an electron discharge device having a cathode, anode and control electrode, means for connecting said cathode and anode to said input and output terminals respectively, impedance means for connecting said control electrode to said point of reference potential, a further impedance means disposed between said control electrode and one of said terminals, said further impedance means offering relatively lower impedance to said undesired frequency components and relatively higher impedance to said desired frequency components than said impedance means connecting said control electrode to said point of reference potential so that the desired components will be developed between said output terminal and said point of reference potential substantially to the exclusion of said undesired components.

References Cited in the file of this patent

UNITED STATES PATENTS

| | | |
|---|---|---|
| 2,241,892 | Strong | May 13, 1941 |
| 2,382,097 | Purington | Aug. 14, 1945 |
| 2,524,821 | Montgomery | Oct. 10, 1950 |
| 2,547,213 | Johnson et al. | Apr. 3, 1951 |
| 2,574,868 | Green | Nov. 13, 1951 |

OTHER REFERENCES

Electronics, January 1937, pages 13 and 14.

RCA Review, vol. XII, issue #1 pages 3–26 (page 8 pertinent), pub. March 1951.